Feb. 27, 1934.  J. DE LA CIERVA  1,948,514
AIRCRAFT WITH ROTATIVE WINGS
Filed March 3, 1930   6 Sheets-Sheet 1

Fig. 1.

INVENTOR
Juan de la Cierva
BY
Lynnestvedt & Lechner
ATTORNEYS

Feb. 27, 1934.  J. DE LA CIERVA  1,948,514
AIRCRAFT WITH ROTATIVE WINGS
Filed March 3, 1930  6 Sheets-Sheet 5

Fig. 6.

INVENTOR
Juan de la Cierva
BY
Symmestvedt & Lechner
ATTORNEYS

Patented Feb. 27, 1934

1,948,514

UNITED STATES PATENT OFFICE 1,948,514

AIRCRAFT WITH ROTATIVE WINGS

Juan de la Cierva, Madrid, Spain, assignor to Autogiro Company of America, Philadelphia, Pa., a corporation of Delaware Application March 3, 1930, Serial No. 432,773, and in Great Britain March 4, 1929

32 Claims. (Cl. 244—19)

This invention relates to aircraft having rotatably mounted sustaining wings or blades and is particularly applicable to the type of aircraft in which the rotatably mounted blades are driven or actuated by the relative atmospheric air-flow while the aircraft is in flight.

This type of aircraft usually includes a set or system of sustaining blades rotatably mounted above the fuselage or body portion of the aircraft, and in order to prevent any portion of the system from fouling on any other part of the aircraft, the blades must be mounted a substantial distance above the fuselage. The result of such mounting is that the center of gravity of the aircraft as a whole is located relatively high, usually considerably higher than in aircraft or airplanes having the usual rigid wing construction.

In considering the following objects of this invention, it should be borne in mind that in machines of this character the propelling force is preferably derived from an engine and propeller, which may be mounted at the front of the aircraft and the lifting or sustaining of the aircraft is effected by means of the system of rotatably mounted blades which are preferably arranged to revolve about a common axis and are actuated by the flow of air resulting from translational movement of the machine with relation to the atmosphere, the blades being pivotally mounted or otherwise arranged so that they are free independently to assume various positions under the influence of centrifugal, lift, and other forces.

One of the primary objects of the present invention is to improve the efficiency, stability, and controllability, particularly of aircraft of the above outlined general type.

More specifically, the present invention contemplates the mounting of the propelling means, in aircraft of this type, in such manner that the line of thrust thereof, when extended, passes approximately through a horizontal transverse line drawn through the center of gravity of the aircraft as a whole.

Still another object of the invention is to ensure that the efficiency of lift due to the rotation of the rotative wings or blades under the influence of the air-flow be maintained at or near the maximum, and to this end the invention contemplates the arrangement or angular disposition of the propelling means with respect to the general path of travel of the rotative wing system in such manner that at least a portion of the slip-stream or back-wash of the propelling means may be directed upwardly and rearwardly through the path of travel of the sustaining blades, which increases the articulative movement and lifting efficiency thereof.

The present invention also has an an object the provision of means for adjusting the propelling means to vary the position of the line of thrust thereof with respect to the center of gravity of the aircraft, as well as to control the amount of the slip stream which is directed through the path of travel of the sustaining blades.

Still further, the invention has in view the provision of novel means for actuating the sustaining wing system prior to and in preparation for taking off from the ground. The angular disposition of the propelling means with the resultant slip stream flow upwardly through the path of travel of the supporting blades may be employed to assist in initiating rotation of the sustaining blades or such rotation may be augmented or effected entirely by means which are provided for deflecting a portion of the slip stream upwardly toward the system of blades.

How the foregoing, together with other objects and advantages, are obtained will be clear from a consideration of the following description taken with the accompanying drawings which illustrate the preferred embodiment of the invention, and in which—

Figure 1:
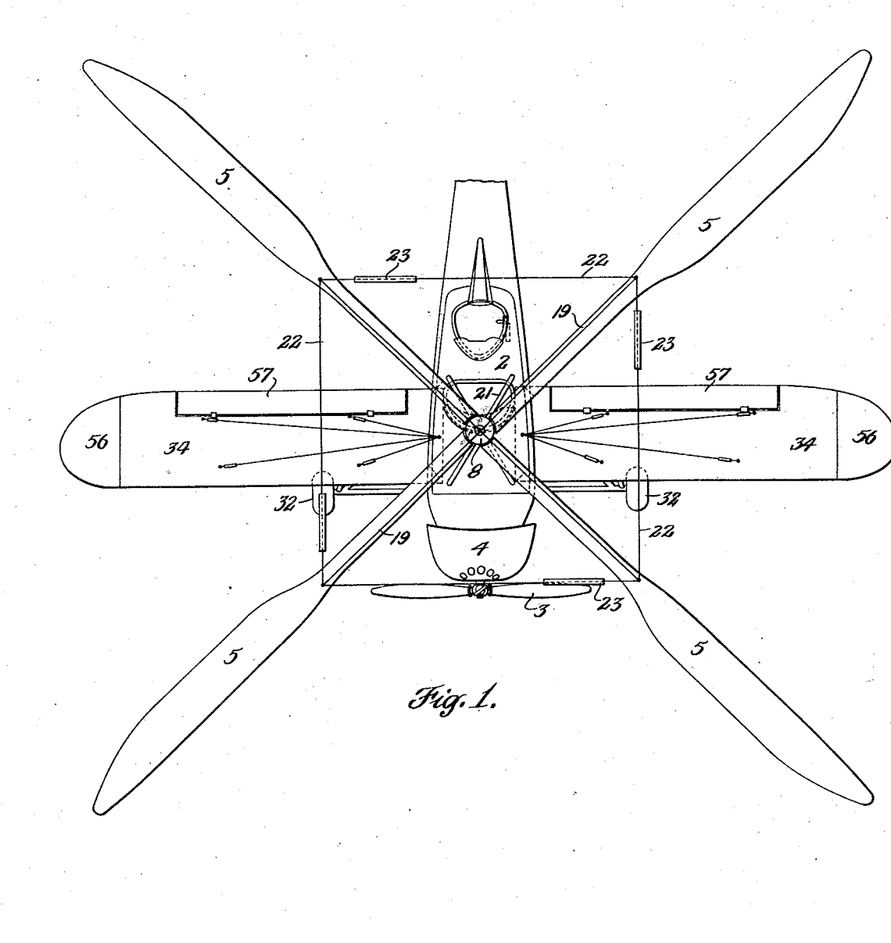
Figure 1 is a plan view of an aircraft with rotative wings, embodying my improvements (certain details being omitted for the sake of clarity)
Figure 2:
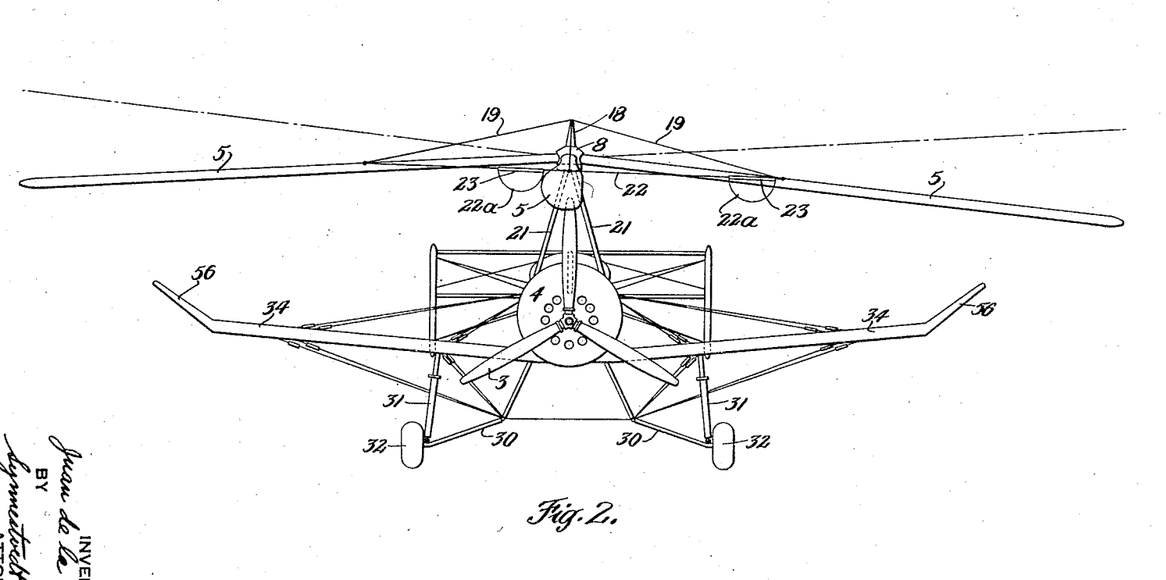
Figure 2 is a front elevational view of the aircraft of Figure 1, with the rotative blades turned to a position 45° from that shown in Figure 1.
Figure 3:
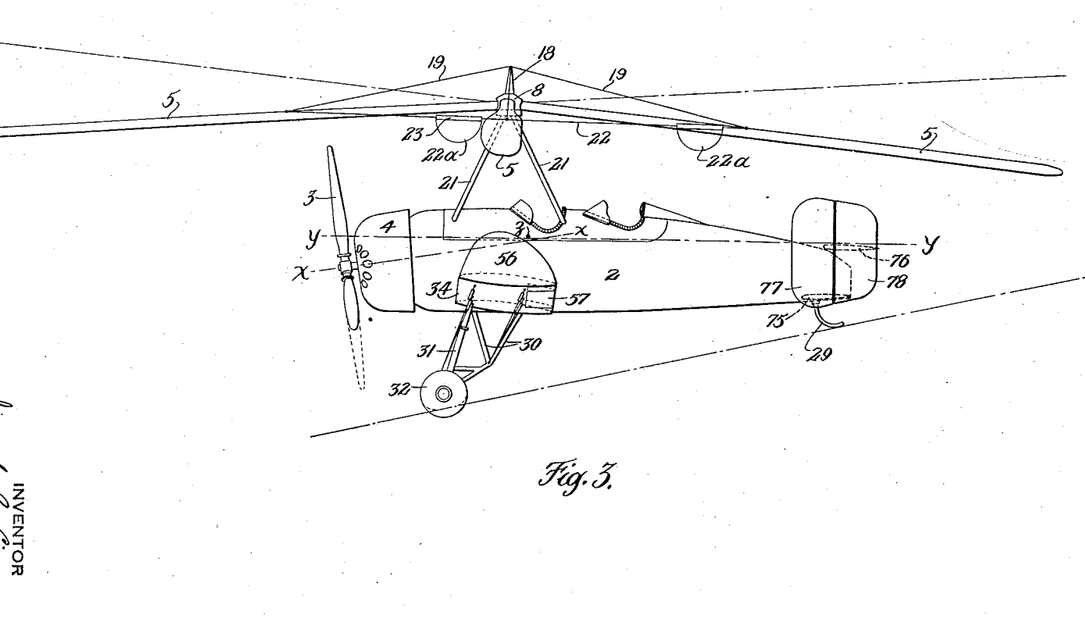
Figure 3 is a side elevation of the aircraft, with the wings in the position of Figure 2.
Figure 6:
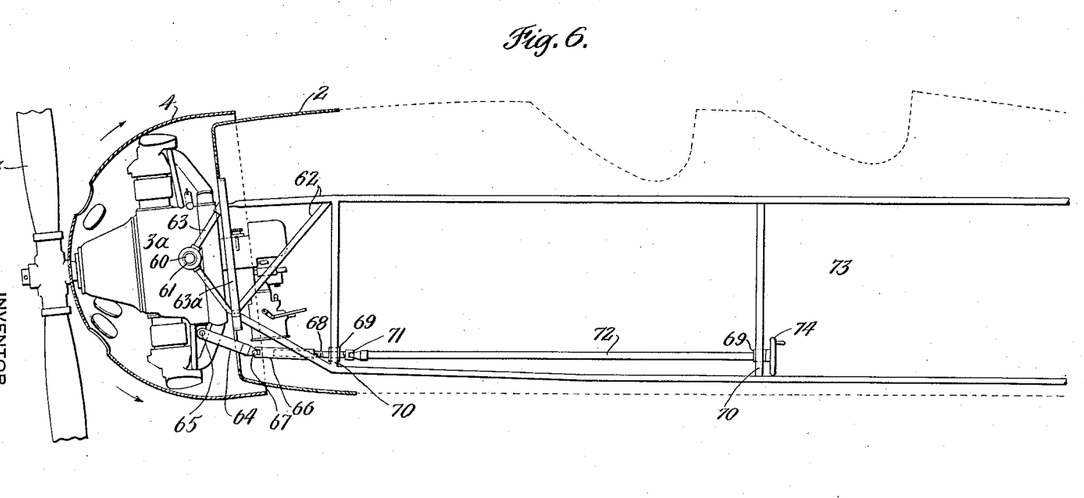
Figure 6 is an enlarged somewhat diagrammatic side view of a portion of the fuselage of the aircraft, including a showing of the means for adjusting the angle or disposition of the engine.

By reference first to Figures 1, 2 and 3, it will be seen that I have illustrated an aircraft having a body or fuselage 2, at the front of which is the propelling means comprising a propeller 3 which may be driven by any suitable means such as an engine 3a (see Figure 6) enclosed in the cowling 4; and above which is the usual sustaining unit or rotor, now commonly used on this type of aircraft, comprising a plurality of wings or blades 5 (four being here shown, although it will be understood that more or less than four may be employed) which may either be made flexible, or, as shown in my co-pending application Serial No. 414,901, filed December 18, 1929, may be pivotally mounted, so that they may be independently free to compensate or adjust themselves to variations in centrifugal, lift, and other forces.

The sustaining blades 5 are preferably mounted to revolve about a common axis or shaft (not shown) enclosed within the casing 8, above which is arranged the cone or rotor head tip 18, mounted to revolve or rotate with the system of blades and the casing 8. In order to support the blades when they are inactive, supporting or tension wires 19 are secured at or near the apex of the cone 18 and extend therefrom to the blades of the wing system. The entire wing system is supported above the fuselage of the aircraft by means of the struts 21 and in order to prevent undue displacement of the blades angularly in their general plane of rotation (see Figures 1 and 2) when they are revolving at slow speeds or are at rest, they may be flexibly interconnected by means, such as cables 22, in each of which an elastic, such as the rubber shock absorber 23, may be interposed. As a precautionary measure the flexible members 23 may be jumped, or by-passed by a slack section of cable 22a, as best shown in Figure 2.

The foregoing general arrangement of rotor, or sustaining unit, is not, per se, a part of the present invention, but is described in detail because of its relation to other parts of the aircraft, as will appear hereinafter.

As seen in Figures 1 to 3, I have provided the aircraft with auxiliary or supplemental sustaining means comprising, in the preferred embodiment herein illustrated, a pair of substantially fixed wing members 34 extending laterally from the lower portion of the fuselage 2 and provided at their outer ends, with upturned tip portions 56 serving, automatically, to effect certain lateral stability of the aircraft. In addition, the wing sections 34 serve to support adjustable or aileron surfaces 57 of the usual type.

As will be seen from Figures 2 and 3, the aircraft is also provided with a tail skid 29 and suitable landing gear, including the bracing structure 30, shock absorbers 31 and wheels 32, the wheels preferably being resilient or flexible, as in the all-rubber type, so that the wheels and shock absorbers together will provide sufficient vertical travel to take the final thrust of the vertical descent of which the machine is capable. It should be noted, however, that the landing gear here shown is not a part of the present invention per se, but is described and claimed in the copending application of Agnew E. Larsen, Serial No. 528,280, filed April 7th, 1931.

According to the present invention, the propelling means including the propeller 3 and the engine 3a are mounted, preferably at the forward end of the fuselage 2, in such a manner that the line of thrust thereof, when extended, passes through or approximately through the center of gravity of the aircraft as a whole (indicated at z), which, as pointed out above, is necessarily relatively high, in view of the fact that the sustaining wing system should be mounted a substantial distance above the body of the aircraft in order to prevent the wings or blades 5 from fouling on any other portion of the machine, such for example, as the propeller or the tail structure. When so mounted the line of thrust of the propelling means (indicated by the line $x—x$ in Figure 3) is angularly disposed with respect to the longitudinal axis of the fuselage 2 (indicated by the line $y—y$ in Figure 3), and it should be observed that the relative mounting of the wing system and the propelling means also results in the passage of at least a portion of the slip-stream of the propelling means through the general path of travel of the wing system. The relative arrangement of these portions of the machine is advantageous, firstly, as the passage of the line of thrust through, or approximately through, the center of gravity of the aircraft makes for stability under various flying conditions and prevents the aircraft from adopting a climbing attitude with the engine "on", and a diving attitude with the engine "off", as would be the result if the propelling means was mounted in accordance with common practice in the construction of the rigid wing type of airplane, where the line of thrust approximately coincides with or is parallel to, the longitudinal axis of the fuselage. Furthermore, the passage of part or all of the slip stream of the propelling means through the disc area defined by the sustaining blades in rotation aids in initiating rotation of the blades before take-off, and in maintaining the efficiency of the blades in rotation at or near the maximum.

If desired, means may be provided for altering the inclination of the propeller 3 or the power plant 3a itself in order to shift the position or the angular disposition of the line of thrust with respect to the center of gravity of the aircraft, as well as to control the amount of the back-wash which is directed through the rotor's path of travel. To this end I have mounted the engine for rotative movement about a substantially horizontal axis, the mounting (see Fig. 6) including pins 60 rotatably mounted in the trunnions or bearings 61 which may be supported from the framework 62 of the fuselage 2 by means of pairs of forwardly converging members or struts 63 arranged at each side of the transversely disposed open frame 63a. In order to effect the adjustment a link 64 is pivotally mounted on the engine as at 65, from which point it extends rearwardly and is coupled to the internally threaded shaft 66 by means of a joint 67. The adjusting mechanism also includes the shaft 68 adapted to be threaded into and out of the shaft 66 and held as against longitudinal movement by means of collars 69 positioned to engage stationary parts 70. The shaft 68 is connected by means of the universal 71 to the operating shaft or rod 72 which extends rearwardly on a horizontal diagonal into a control cockpit 73, at which point it may be provided with suitable means for imparting rotation thereto, such, for example, as the hand wheel 74.

The present invention also contemplates the provision of a novel tail structure which, in addition to the mechanism for controlling the longitudinal attitude, as well as the direction of the aircraft in flight, includes means, associated therewith, which may be employed to effect or aid in initially starting rotation of the supporting blades prior to taking off from the ground.

To this end the tail structure includes a pair of aerofoil surfaces 75, 75 arranged on opposite sides of the fuselage normally serving as substantially fixed horizontal stabilizing elements, and an upper aerofoil surface 76, also substantially horizontally arranged, and positioned in staggered relation to, i. e., upwardly and rearwardly of, the surfaces 75, and normally serving in flight as the usual elevator control. That is, the surface 76 is arranged above and at least partially rearward of the stabilizing surface 75, 75. In addition, the tail structure includes the stationarily mounted and vertically disposed fins 77, 77 arranged at opposite ends of the intervening horizontal surfaces 75 and 76. Rudder members or surfaces 78 are preferably arranged in back of and in line with the elements 77. The rudder members 78 are suitably connected to the rudder controls 78a in the cockpits of the aircraft, by means of any suitable connections, such, for example, as the pivoted double bell crank 78b, cables 78c, and push and pull rods 78d, the rudders pivoting about the vertical axes 78e. The rudders serve also an important function in preventing dispersal of the deflected slip stream laterally.

Figure 4:
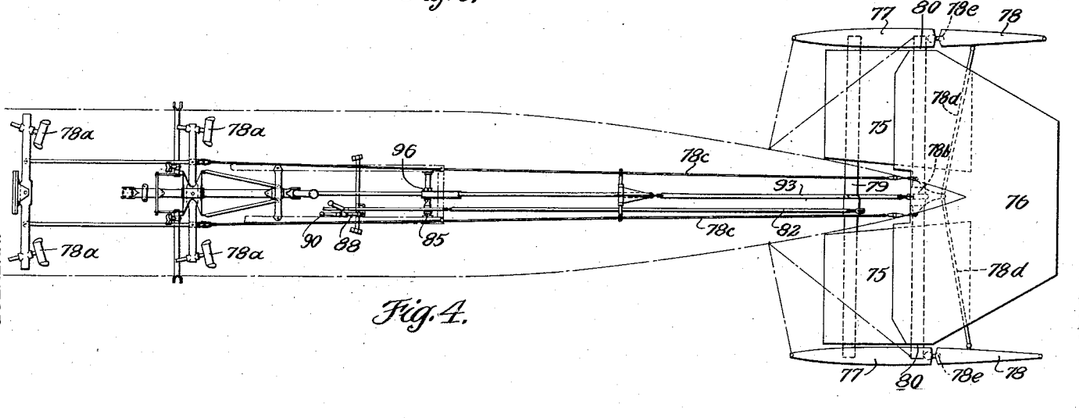
Figure 4 is a somewhat diagrammatic plan view of the controlling mechanism for the various aerofoil surfaces of the tail structure.
Figure 5:
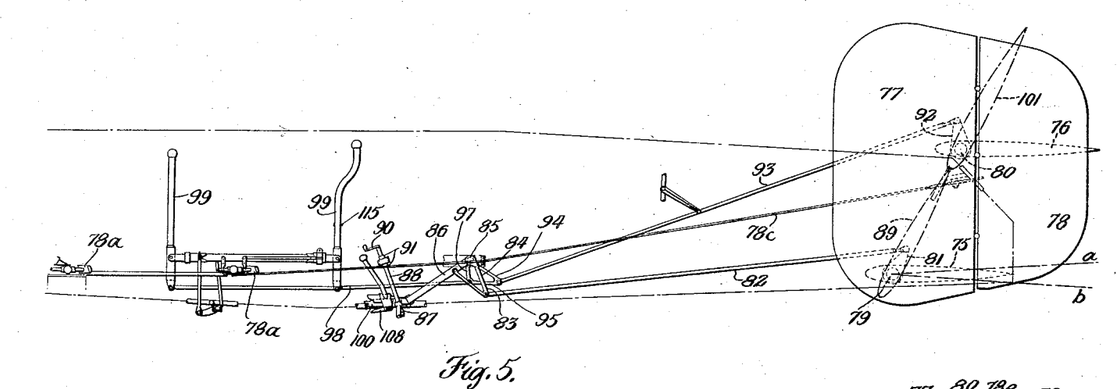
Figure 5 is a side view of the portions of the apparatus illustrated in Figure 4.

By reference particularly to Figures 4 and 5, it will be seen that the aerofoil surfaces 75 and 76 are fixedly mounted, respectively, on rotating shafts 79 and 80, the arrangement and relative positions of the surfaces 75 and 76 being such that, when they are rotated to a position in which they are inclined upwardly and rearwardly (see dotted line showings 89 and 101) they co-operate with each other in forming a substantially complete and uniform upwardly and rearwardly inclined deflecting surface, for deflecting slip stream from the propelling means through the area of traverse of the sustaining blades 5.

Normal flight adjustments of the stabilizer 75 through a small angle $a$, $b$ are effected by means of the crank 81, which is fixed on shaft 79, rod 82 extending forwardly to arm 83 of bell crank 84, which is pivoted on a fixed support at 85, the other arm 86 of said crank extending downwardly and forwardly for engagement (through means later to be described) with a collar 87 which is threadedly mounted on a rotatable rod 88, actuable by handle 90, but fixed as against longitudinal movement, by the collars 91. Normal flight adjustments of the elevator 76 are effected by crank 92 fixed on shaft 80, and connected, through rod 93, to an arm 94 of bell crank 95, which is pivoted on a fixed point as at 96, the other arm 97 of said bell crank being connected by rod 98 to the lower ends of the usual control sticks 99 in the cockpits.

Figure 7:
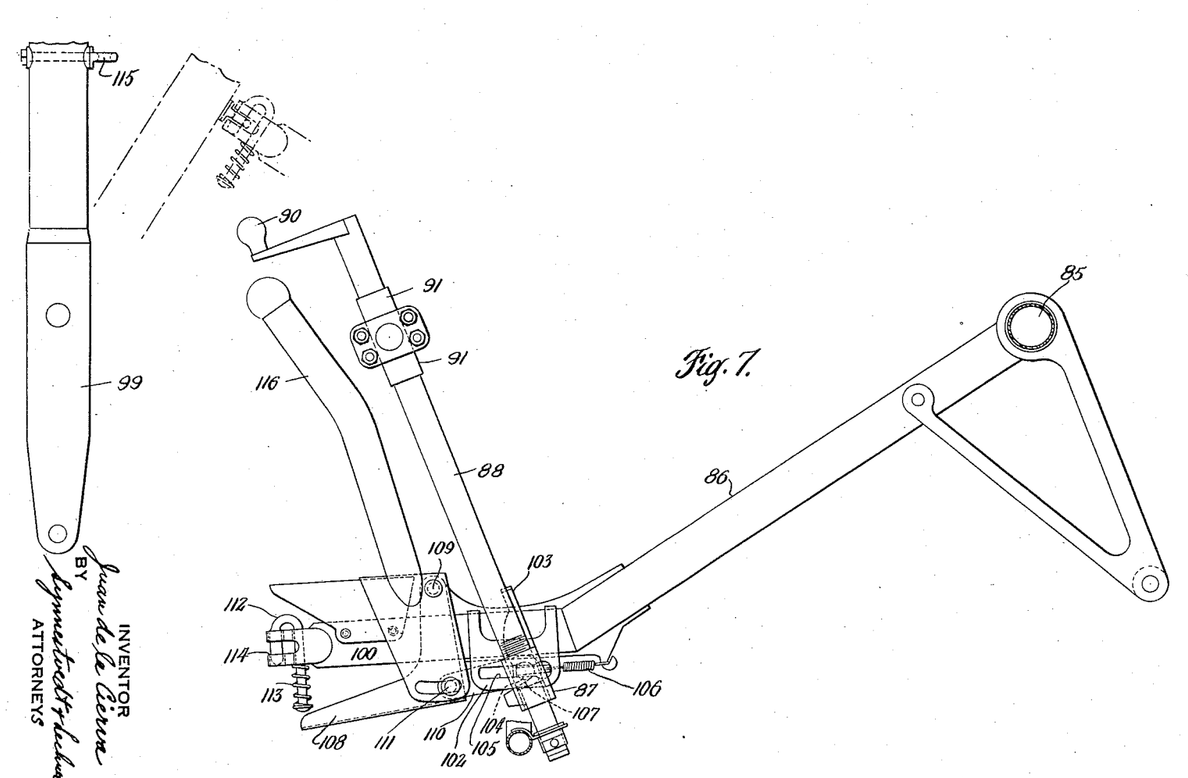
Figure 7 is an enlarged side elevational view illustrating certain details of the structure shown in Fig. 5.

In order to effect adjustment of the surfaces 75 and 76 to the extreme upward position, as in dotted line showings 89 and 101 in Figure 5, when it is desired to employ the same for deflecting purposes, I have provided the following apparatus:

Arm 86 of bell crank 84, as best seen in Figure 7, has a forward extension 100 which carries a depending yoke 102, said extension and yoke being in normal flight positioned between a pair of guides 103 which are formed in unity with the internally threaded collar 87. A pin 104, mounted transversely in slots 105, is pulled rearwardly by a spring 106 into engagement with recesses 107 formed in the guides 103, so that any rotation of handle 90, causing upward and downward movement of collar 87, normally effects a corresponding movement of the arm 86 and its associated parts; but when the additional movement above referred to is desired, an upward pull upon member 108 which is pivoted on extension 100 at the point 109, pulls the pin 104 out of engagement with the slots 107 by means of the link 110 and pin 111.

The initial upward movement of the member 108 raises the U-shaped pin 112, against the pressure of spring 113 so as to leave slot 114 free to receive the eye 115 which is mounted on the rear control stick 99. As the arm 86 is moved up the control stick 99 is moved backwardly and the eye 115 is inserted in slot 114, whereupon, upon release of the hand grip member 108, the spring 113 pulls the U pin 112 down through the eye 115. With the parts so positioned, the interlocked connection with the control stick 99 holds the surfaces 75 and 76 in their extreme upwardly inclined position, to effect deflection of the propeller slip stream against the rotor blades, for initiating rotation of the same. For convenience of the pilot, so that he need not reach down to the floor of the cockpit to grasp the hand grip 108, there may be secured thereto an extension handle 116.

As soon as the rotor has attained proper speed for taking off, the pilot simply disconnects arm 86 from stick 99, leaving the stick 99 free for normal operation, and drops the arm 86 into the full line position shown in Figure 7, where it automatically reengages the fixed stabilizer adjustment device.

It will thus be seen that while I have provided mechanism by which the control surfaces can, on the one hand, be held in their deflecting or starting position, by interconnecting the two controls, yet they immediately and automatically upon disconnection, tend to assume positions for normal flying operation, the stabilizer control automatically dropping into fixed engagement with the relatively fixed device which provides for minor independent adjustments in flight.

It should be observed that according to the broad aspect of my invention either one or both of the normally horizontally disposed aerofoils of the tail structure may be moved or rotated to deflecting position as above described in order to supplement the action of the portion of the slip stream or back wash of the propeller which directly impinges against the rotor blades, or that the entire deflection of air through the rotor disk area, for starting, may be effected by the tiltable bi-plane tail arrangement. In other words, if desired, the direct action of the slip stream of the propelling means may be relied on for initiating movement of the blades prior to taking off, or one or both of the surfaces 75, 76, may be moved to deflecting position to effect this result or to supplement the action of such portion of the slip stream as may directly strike the blades.

In conclusion it should be observed that the angle at which the propelling means is mounted is advantageous for purposes of longitudinal stability, as well as for its effect upon the rotor, not only in starting, but also in flight, in view of the fact that the effect of the back wash striking the blades tends to increase the efficiency of the rotating system. Attention should also be called to the fact that the means for adjusting the angle of the engine with its propeller permits a control of the position of the line of thrust with respect to the center of gravity of the aircraft, to compensate for varying load conditions, either while the aircraft is in flight or while it is at rest on the ground. Finally, it should be observed that the controlling means for the angle of the engine may be so constructed as to provide a range of movement sufficiently great to eliminate the necessity for employing additional deflecting means in the tail structure, that is, the adjusting mechanism may provide for a position of the engine by which the slip stream is directed at such an angle with respect to the general path of travel of the rotor that the force applied to the blades thereof is sufficient to eliminate the necessity for the supplemental deflecting means for starting.

As for the controls for the tail surfaces, it should be noted that a high degree of safety is attained in that the normal adjustments or movements thereof, for flight, are prevented so long as the means for effecting deflection of the slip-stream, for starting, is in its effective position. Furthermore, when the two control systems are brought together into deflecting position they are interlocked, so that the pilot need not hold them, against the pressure of the slip-stream.

What I claim is:—

1. In an aircraft having sustaining blades rotatably mounted for actuation by the relative air-flow in flight, propelling means vertically offset with respect to the center of gravity of the aircraft and set at such an angle that its line of thrust passes approximately through the center of gravity of the aircraft.

2. In an aircraft having sustaining blades rotatably mounted for actuation by the relative air-flow in flight, propelling means vertically offset with respect to the center of gravity of the aircraft and set at such an angle that its line of thrust passes approximately through the center of gravity of the aircraft, together with means for altering the angular setting of the propelling means.

3. An aircraft including sustaining blades rotatably mounted for actuation by the relative air-flow in flight, the blades being arranged for individual force compensating movements, and forward porpelling means including a propeller the axis of rotation of which is positioned in such manner that at least a portion of the slip stream of the propeller, in its normal path of travel therefrom, passes through the path of travel of the sustaining blades.

4. An aircraft including sustaining blades rotatably mounted for actuation by the relative air-flow in flight, the blades being arranged for individual force compensating movements, and forward propelling means including a propeller the axis of rotation of which is positioned in such manner that a portion of the slip stream of the propeller, in its normal path of travel therefrom, passes through the path of travel of the sustaining blades, together with means for deflecting another portion of the slip stream through the said path of travel of the sustaining blades.

5. An aircraft including sustaining blades rotatably mounted for actuation by the relative air-flow in flight and forward propelling means including a propeller the axis of rotation of which is positioned in such manner that at least a portion of the slip stream of the propeller passes through the path of travel of the sustaining blades, together with means for adjusting the position of the said axis to alter the amount of the slip stream which passes through said path.

6. An aircraft including a fuselage, sustaining blades rotatably mounted for actuation by the relative air-flow in flight, propelling means, means for adjusting the angle of thrust of the propelling means and an aerofoil normally positioned to serve as a stabilizing element but movable to a position to deflect at least a portion of the slip stream of the propelling means upwardly through the path of travel of the sustaining blades.

7. An aircraft including a fuselage, sustaining blades rotatably mounted for actuation by the relative air-flow in flight, propelling means, means for adjusting the angle of thrust of the propelling means and an aerofoil normally positioned to serve as a stabilizing element but movable to a position to deflect at least a portion of the slip stream of the propelling means upwardly through the path of travel of the sustaining blades, together with means for adjusting said aerofoil when in normal position to control the angle of flight of the aircraft.

8. An aircraft including a fuselage, sustaining blades rotatably mounted for actuation by the relative air-flow in flight, forward propelling means positioned to direct a portion of the slip stream therefrom through the path of travel of the sustaining blades and an aerofoil normally positioned to serve as a stabilizing element but movable to a position to deflect another portion of the slip stream upwardly through the said path of travel.

9. An aircraft including sustaining blades rotatably mounted for actuation by the relative air-flow in flight, forward propelling means, a plurality of aerofoil surfaces positioned at least partially one above the other and mounted in the slip stream of the propelling means to rotate about axes disposed substantially prependicular to the longitudinal plane of symmetry of the aircraft and means for adjusting said surfaces to a position in which a portion of the said slip stream is deflected through the path of travel of the sustaining blades.

10. An aircraft including sustaining blades rotatably mounted for actuation by the relative air-flow in flight, forward propelling means, a plurality of aerofoil surfaces mounted in the slip stream of the propelling means to rotate about axes disposed substantially perpendicular to the longitudinal plane of symmetry of the aircraft and means for adjusting said surfaces to a position in which a portion of the said slip stream is deflected through the path of travel of the sustaining blades, the said surfaces being so positioned with respect to each other that, when adjusted to deflecting position, they form one substantially continuous deflecting surface.

11. An aircraft including a fuselage, sustaining blades rotatably mounted above the fuselage for actuation by the relative air-flow in flight, forward propelling means, a tail structure mounted on the fuselage and underlying the path of travel of the sustaining blades including a pair of aerofoil surfaces normally positioned to serve as stabilizing elements and means for moving said surfaces to a position in which they extend upwardly and rearwardly with respect to the slip stream of the propelling means, whereby a portion of such slip stream is deflected to pass through the path of travel of the sustaining blades.

12. An aircraft including a fuselage, sustaining blades rotatably mounted above the fuselage for actuation by the relative air-flow in flight, forward propelling means, a tail structure mounted on the fuselage and underlying the path of travel of the sustaining blades including a pair of aerofoil surfaces normally positioned to serve as stabilizing elements and means for moving said surfaces to a position in which they extend upwardly and rearwardly with respect to the slip stream of the propelling means, whereby a portion of such slip stream is deflected to pass through the path of travel of the sustaining blades, together with means for adjusting at least one of said surfaces when in normal position to control the angle of flight of the aircraft.

13. An aircraft including a fuselage, propelling means, sustaining blades rotatably mounted for actuation by the relative air-flow in flight and a tail structure at least partially located below the path of travel of the sustaining blades including an aerofoil with means for adjusting the same to control the angle of flight of the aircraft and a second aerofoil normally located in a plane separated from and substantially parallel to the plane of the first aerofoil but movable to a position to deflect at least a portion of the slip stream of the propelling means upwardly through the path of travel of the sustaining blades.

14. An aircraft including a fuselage, propelling means, sustaining blades rotatably mounted for actuation by the relative air-flow in flight and a tail structure at least partially located below the path of travel of the sustaining blades including an aerofoil with means for adjusting the same to control the angle of flight of the aircraft and a second aerofoil normally located in a plane separated from and substantially parallel to the plane of the first aerofoil, together with means for moving both of said aerofoils into positions to deflect at least a portion of the slip stream of the propelling means upwardly through the path of travel of the said blades.

15. An aircraft including a fuselage, propelling means, sustaining blades rotatably mounted for actuation by the relative air-flow in flight and a tail structure at least partially located below the path of travel of the sustaining blades including an aerofoil with means for adjusting the same to control the angle of flight of the aircraft and a second aerofoil normally located in a plane separated from and substantially parallel to the plane of the first aerofoil, together with separate means for moving said aerofoils into position to deflect at least a portion of the slip stream of the propelling means upwardly through the path of travel of the said blades.

16. An aircraft including a fuselage, propelling means, sustaining blades rotatably mounted for actuation by the relative air-flow in flight and a tail structure at least partially located below the path of travel of the sustaining blades including an aerofoil with means for adjusting the same to control the angle of flight of the aircraft and a second aerofoil normally located in a plane separated from and substantially parallel to the plane of the first aerofoil together with separate means for moving said aerofoils into position to deflect at least a portion of the slip stream of the propelling means upwardly through the path of travel of the said blades, and means for interconnecting the said separate means to retain the aerofoils in deflecting position.

17. An aircraft including a fuselage, propelling means, sustaining blades rotatably mounted for actuation by the relative air-flow in flight and a tail structure at least partially located below the path of travel of the sustaining blades including an aerofoil with means for adjusting the same to control the angle of flight of the aircraft and a second aerofoil normally located in a plane separated from and substantially parallel to the plane of the first aerofoil, together with separate means for moving said aerofoils into position to deflect at least a portion of the slip stream of the propelling means upwardly through the said path of travel, said aerofoils being so positioned with respect to each other that when moved to deflecting position they cooperate in forming one substantially continuous deflecting surface.

18. In an aircraft having propelling means, and sustaining blades mounted for rotation by relative air-flow, control surfaces for the aircraft, means whereby at least one of said surfaces may be utilized to deflect slip-stream from the propelling means against the sustaining blades to initiate rotation thereof prior to take-off, and means whereby normal operation of the aircraft controls for flight is prevented as long as said other means is in effective position.

19. In an aircraft having propelling means, and sustaining blades mounted for rotation by relative air-flow, control surfaces for the aircraft, means whereby at least one of said surfaces may be utilized to deflect slip-stream from the propelling means against the sustaining blades to initiate rotation thereof prior to take-off, and means whereby said first-mentioned means may be locked in its effective position.

20. In an aircraft having propelling means, and sustaining blades mounted for rotation by relative air-flow, a control surface and a stabilizing surface on said aircraft, means for effecting normal flight adjustments of at least one of said surfaces, means for effecting extreme adjustment of at least one of said surfaces whereby slipstream from the propelling means may be deflected thereby against the sustaining blades for initiating rotation, and means for interconnecting said two means.

21. In combination with an aircraft having propelling means and sustaining blades mounted for rotation by relative air-flow, means for effecting a flow of slip-stream from the propelling means against the sustaining blades, the last mentioned means including means serving normally as a stabilizer, and means for adjusting the said last mentioned means to vary its stabilizing effect.

22. In combination with an aircraft having propelling means and sustaining blades mounted for rotation by relative air-flow, means for effecting a flow of slip-stream from the propelling means against the sustaining blades, including a normally substantially fixed and horizontally disposed aerofoil pivotally mounted toward its forward edge, and means for pivoting said aerofoil to a position angled with respect to the horizontal.

23. In combination with an aircraft having propelling means and sustaining blades mounted for rotation by relative air-flow, an elevator surface and a normally substantially horizontally disposed stabilizing surface mounted toward its forward edge to rotate on a transverse axis and means for adjusting both of said surfaces to a position to cause a flow of slip-stream from the propelling means against the sustaining blades.

24. In combination with an aircraft having propelling means and sustaining blades mounted for rotation by relative air-flow and means for effecting a flow of slip-stream from the propelling means against the sustaining blades including a member pivoted toward its forward edge on a transverse axis and serving in normal flight as a substantially fixed stabilizer.

25. In an aircraft having propelling means and sustaining blades mounted for rotation by relative air-flow, a tail structure including a normally substantially horizontally disposed stabilizer, a mounting therefor including a pivot extending transversely of the craft, a pair of substantially vertically disposed stabilizers supported at least in part by said pivot and positioned one at each side of the stabilizer first mentioned and means for moving the stabilizer first mentioned to a position to deflect slip-stream against the sustaining blades.

26. In an aircraft having propelling means and sustaining blades mounted for rotation by relative air-flow, a tail structure including a normally substantially horizontally disposed stabilizer, a mounting therefor including a pivot extending transversely of the craft, a pair of substantially vertically disposed stabilizers supported at least in part by said pivot and positioned one at each side of the stabilizer first mentioned and means for moving the stabilizer first mentioned to a position to deflect slip-stream against the sustaining blades, together with rudder elements mounted on the substantially vertically disposed stabilizers.

27. In an aircraft having propelling means and sustaining blades mounted for rotation by relative air-flow, a tail structure including a normally substantially horizontally disposed stabilizer, an elevator, mounting means for the stabilizer and the elevator including pivots extending substantially transversely of the craft, a pair of substantially vertically disposed stabilizers supported at least in part by said pivots and arranged at each side of the stabilizer first mentioned and means for moving the stabilizer first mentioned and the elevator to positions to deflect slip-stream against the sustaining blades.

28. In an aircraft having propelling means and sustaining blades mounted for rotation by relative air-flow, a tail structure including a normally substantially horizontally disposed stabilizer, an elevator, mounting means for the stabilizer and the elevator including pivots extending substantially transversely of the craft, a pair of substantially vertically disposed stabilizers supported at least in part by said pivots and arranged at each side of the stabilizer first mentioned and means for moving the stabilizer first mentioned and the elevator to positions to deflect slip-stream against the sustaining blades, together with rudder elements mounted on the substantially vertically disposed stabilizers.

29. An aircraft including, as its primary means of suspension, a system of sustaining blades or wings mounted above the body of the craft for normal actuation by relative air-flow in flight, propelling means for the craft with its center of gravity disposed below a horizontal plane containing the center of gravity of the craft as a whole, the propelling means being set at such an angle that its line of thrust passes approximately through the center of gravity of the craft as a whole.

30. In an aircraft, a body, a forward propulsion engine with crank-shaft, a propeller, a sustaining rotor including a generally upright axis structure mounted for normally free rotation in flight and elongated wing means pivotally mounted on said axis structure in position to be normally aerodynamically rotated by the relative air-flow in flight, said rotor being mounted to provide for rotation of the wing means in a path which clears the propeller and other parts of the body which lie beneath the wing means, by which arrangement of the sustaining rotor a substantial degree of stability is obtained, especially in vertical descent, but by which the center of gravity of the craft as a whole is higher than the center of said engine as defined by its crank-shaft, and the propeller being so positioned that its thrust line approximately intersects the transverse axis of the craft passing through the said center of gravity whereby longitudinal stability of the craft is substantially maintained under any degree of operation of the engine.

31. In an aircraft, a body, forward propulsion means including a propeller, a sustaining rotor including a generally upright axis structure mounted for normally free rotation in flight and elongated wing means pivotally mounted on said axis structure in position to be normally aerodynamically rotated by the relative air-flow in flight, said rotor being mounted to provide for rotation of the wing means in a path which clears the propeller and other parts of the body which lie beneath the wing means, by which arrangement of the sustaining rotor a substantial degree of stability is obtained, especially in vertical descent, but by which the center of gravity of the craft as a whole is higher than a horizontal plane passing through the center of said propeller, and said propeller being so arranged that its thrust line is tilted with respect to said horizontal plane so as to approximately intersect the transverse axis of the craft passing through the said center of gravity whereby longitudinal stability of the craft is substantially maintained under any degree of operation of the forward propulsion means.

32. In an aircraft, a body, forward propulsion means including a propeller, a sustaining rotor including a generally upright axis structure mounted for normally free rotation in flight and elongated wing means pivotally mounted on said axis structure in position to be normally aerodynamically rotated by the relative air-flow in flight, said rotor being mounted to provide for rotation of the wing means in a path which clears the propeller and other parts of the body which lie beneath the wing means, by which arrangement of the sustaining rotor a substantial degree of stability is obtained, especially in vertical descent, but by which the center of gravity of the craft as a whole is higher than a horizontal plane passing through the center of said propeller, and said propeller being so arranged that its thrust line is tilted with respect to said horizontal plane so as to approximately intersect the transverse axis of the craft passing through the said center of gravity whereby longitudinal stability of the craft is substantially maintained under any degree of operation of the forward propulsion means, and means for shifting the thrust line of the propeller, whereby variations in the location of the center of gravity as produced by variations in loading may be compensated for.

JUAN DE LA CIERVA.